US012256028B2

(12) United States Patent
Quirk et al.

(10) Patent No.: US 12,256,028 B2
(45) Date of Patent: Mar. 18, 2025

(54) CROSS CHAIN ACCESS GRANTING TO APPLICATIONS

(71) Applicant: Unstoppable Domains, Inc., Las Vegas, NV (US)

(72) Inventors: Aaron Quirk, Raleigh, NC (US); Braden River Pezeshki, Reno, NV (US); Lisa Seacat DeLuca, Bozeman, MT (US)

(73) Assignee: Unstoppable Domains, Inc., Las Vegas, NV (US)

( * ) Notice: Subject to any disclaimer, the term of this patent is extended or adjusted under 35 U.S.C. 154(b) by 373 days.

(21) Appl. No.: 17/851,446

(22) Filed: Jun. 28, 2022

(65) Prior Publication Data
US 2023/0421399 A1    Dec. 28, 2023

(51) Int. Cl.
*H04L 9/00* (2022.01)
*H04L 9/32* (2006.01)

(52) U.S. Cl.
CPC .............. *H04L 9/50* (2022.05); *H04L 9/3239* (2013.01); *H04L 9/3247* (2013.01)

(58) Field of Classification Search
CPC ....... H04L 9/50; H04L 9/3239; H04L 9/3247; H04L 9/3213
See application file for complete search history.

(56) References Cited

U.S. PATENT DOCUMENTS

| 9,553,981 B2 | 1/2017 | Czarnecki et al. |
| 10,846,762 B1 | 11/2020 | Dennis et al. |
| 11,558,344 B1 | 1/2023 | Pezeshki et al. |
| 11,750,570 B1 | 9/2023 | Eby et al. |
| 11,902,444 B2 * | 2/2024 | Kurian .................. H04L 9/3213 |

(Continued)

FOREIGN PATENT DOCUMENTS

| CN | 1984185 A | | 6/2007 |
| KR | 20210111066 A | * | 9/2021 |
| WO | 2020/010023 A1 | | 1/2020 |

OTHER PUBLICATIONS

International Search Report and Written Opinion in International Application No. PCT/US23/68858, dated Oct. 19, 2023, 8 pages.

(Continued)

*Primary Examiner* — Mohammed Waliullah
(74) *Attorney, Agent, or Firm* — Edell, Shapiro & Finnan, LLC

(57) ABSTRACT

According to a present invention embodiment, a system for granting access to applications associated with different blockchains comprises one or more memories and at least one processor coupled to the one or more memories. The system verifies a non-fungible token of a first blockchain is owned by a user. The non-fungible token is indicated by the user for access to an application associated with a second blockchain. Information for the second blockchain is retrieved from information for different blockchains associated with the non-fungible token. A blockchain address of the second blockchain is verified as being associated with the user based on the information for the second blockchain to grant access to the application. Embodiments of the present invention further include a method and computer program product for granting access to applications associated with different blockchains in substantially the same manner described above.

24 Claims, 6 Drawing Sheets

(56) References Cited

U.S. PATENT DOCUMENTS

| | | | | |
|---|---|---|---|---|
| 12,010,240 | B2* | 6/2024 | Advani | H04L 9/3213 |
| 2015/0356523 | A1 | 12/2015 | Madden | |
| 2016/0217436 | A1 | 7/2016 | Brama | |
| 2016/0330027 | A1 | 11/2016 | Ebrahimi | |
| 2019/0096021 | A1 | 3/2019 | Jarvis et al. | |
| 2020/0364703 | A1* | 11/2020 | Joveski | G06Q 20/065 |
| 2020/0406859 | A1 | 12/2020 | Hassani | |
| 2021/0058353 | A1 | 2/2021 | Creech et al. | |
| 2022/0198049 | A1 | 6/2022 | Dumas et al. | |
| 2022/0198444 | A1 | 6/2022 | Mee et al. | |
| 2023/0108983 | A1* | 4/2023 | Vosseller | G06Q 20/38215 705/76 |
| 2023/0171225 | A1 | 6/2023 | Pezeshki et al. | |
| 2023/0206216 | A1* | 6/2023 | Lehmann | G06Q 20/401 |
| 2023/0291575 | A1* | 9/2023 | Riva | H04L 63/126 |
| 2023/0418979 | A1 | 12/2023 | DeLuca et al. | |
| 2024/0056525 | A1 | 2/2024 | DeLuca | |
| 2024/0146523 | A1 | 5/2024 | DeLuca et al. | |

OTHER PUBLICATIONS

"Allowlists, denylists, and approved senders", Google Workspace Admin Help, https://support.google.com/a/answer/60752?hl=en#:~:text=Email allowlist-A list of,allowlist the contact's IP address 1, downloaded from the internet on Oct. 31, 2022, 1 page.

"S/MIME Digital Signatures", GlobalCerts, https://globalcerts.com/smime-digital-signatures, downloaded from the internet on Oct. 31, 2022, 5 pages.

Blog, "Introducing Humanity Check—100% Opt-In", Unstoppable Domains, https://unstoppabledomains.com/blog/introducing-humanity-check, Mar. 13, 2022, downloaded from the internet on Mar. 25, 2022, 8 pages.

Antoni Zolciak, "Beyond KYC: Stricter Privacy Policies are Looming, But DeFi is Here to Stay", https://www.nasdaq.com/articles/beyond-kyc%3A-stricter-privacy-policies-are-looming-but-defi-is-here-to-stay, Dec. 8, 2021, 7 pages.

"Humanity Check Overview", https://docs.unstoppabledomains.com/login-with-unstoppable/humanity-check/humanity-check-for-login/, downloaded from the internet on Apr. 7, 2022, 5 pages.

"Progressive risk segmentation: your secret to balancing fraud prevention and conversion", https://withpersona.com, downloaded from the internet on Apr. 1, 2022, 7 pages.

Jennifer Lowe, "What is KYC and why does it matter?", Plaid.com, Aug. 12, 2021, 15 pages.

Alex Gomez, "Unstoppable Domains Email (What Is it and How Does it Work?)", Cyber Scrilla, https://cyberscrilla.com/unstoppable-domains-email/#:~:text=How, Sep. 1, 2022, 43 pages.

Adriel Estrada, "Introducing Unstoppable Email with Skiff", Unstoppable Domains, https://unstoppabledomains.com/blog/categories/announcements/article/unstoppable-email-skiff, Aug. 30, 2022, 7 pages.

"ERC: Claim Holder—Issue #735", https://github.com/ethereum/eips/issues/735, GitHub, ethereum/EIPs, downloaded from the internet on Oct. 14, 2022, 21 pages.

"LIPs/LSPs/LSP-6-KeyManager.md", GitHub, lukso-network/LIPS, https://github.com/lukso-network/LIPs/blob/main/LSPs/LSP-6-KeyManager.md, downloaded from the internet on Oct. 14, 2022, 13 pages.

International Search Report and Written Opinion in International Application No. PCT/US23/71399, dated Nov. 16, 2023, 10 pages.

"DNS records for unstoppabledomains.com", Unstoppable Domains, https://www.nslookup.io/domains/unstoppabledomains.com/dns-records/, downloaded from the internet on Nov. 16, 2023, 5 pages.

"Why Are Some Domains Protected?", Unstoppable Domains, Mar. 11, 2022, https://support.unstoppabledomains.com/support/solutions/articles/48001186091-why-are-some-domains-protected, 3 pages.

Wikipedia, "Blockchain", https://en.wikipedia.org/wiki/Blockchain, downloaded from the internet on Mar. 25, 2022, 27 pages.

"How does a transaction get into the blockchain?", Euromoney Learning, https://www.euromoney.com/learning/blockchain-explained/how-transactions-get-into-the-blockchain, downloaded from the internet on Mar. 25, 2022, 9 pages.

Benjamin Powers, "Brave Integrates Crypto Blockchain Domains, Expanding Access to Web 3.0—CoinDesk", https://www.coindesk.com/tech/2021/05/13/brave-integrates-crypto-blockchain-domains-expanding-access-to-web-30/, May 13, 2021, 10 pages.

"What is a non-fungible token (NFT)?", https://www.coinbase.com/learn/crypto-basics/plp-what-is-nft, downloaded from the internet on Mar. 25, 2022, 10 pages.

Michele D'Aliessi, "How Does the Blockchain Work? A Guide to Everything You Need to Know", OneZero, https://onezero.medium.com/how-does-the-blockchain-work-98c8cd01d2ae, Jun. 1, 2016, 21 pages.

James Beck, Blog, "Mirror.xyz Review: How to Use MetaMask to Compete in the $WRITE Race", Jul. 30, 2021, https://consensys.net/blog/metamask/mirror-xyz-review-how-to-use-metamask-to-compete-in-the-write-race, 14 pages.

Amaury Martiny, "One-click Login with Blockchain: a MetaMask Tutorial", https://www.toptal.com/ethereum/one-click-login-flows-a-metamask-tutorial, downloaded from the internet on Mar. 25, 2022, 16 pages.

"Introducing Blend: the Peer-to-Peer Perpetual Lending Protocol for NFT's", https://x.com/blur_io/status/1653051809240604674?s=20, downloaded from the internet Jun. 26, 2024, 2 pages.

Owen Fernau, "Blur Launches NFT Lending Protocol", The Defiant, https://thedefiant.io/news/nfts-and-web3/blur-nft-lending, May 2, 2023, 7 pages.

"Unstoppable Domains launches Login with Unstoppable", https://unstoppabledomains.com/blog/introducing-login-with-unstoppable, Jan. 9, 2022, 7 pages.

Jeff Benson, "You Can Now Use Your .com Domain to Send and Receive Ethereum", https://decrypt.co/79517/you-can-now-use-your-com-domain-send-receive-ethereum Decrypt, Aug. 26, 2021, 8 pages.

"Claim your DNS name onchain in ENS", ENS, https://support.ens.domains/en/articles/7882690-claim-your-dns-name, downloaded from the internet on Feb. 9, 2024, 10 pages.

"Ethereum Name Service (ENS)", https://etherscan.io/token/0xc18360217d8f7ab5e7c516566761ea12ce7f9d72#readContract, downloaded from the internet on Feb. 9, 2024, 4 pages.

"Ethereum Name Service (ENS)", https://etherscan.io/token/0xc18360217d8f7ab5e7c516566761ea12ce7f9d72#writeContract, downloaded from the internet on Feb. 9, 2024, 2 pages.

"Unstoppable Domains (UD)", https://polygonscan.com/token/0xa9a6a3626993d487d2dbda3173cf58ca1a9d9e9f#readProxyContract, downloaded from the internet on Feb. 9, 2024, 3 pages.

"Unstoppable Domains (UD)", https://polygonscan.com/token/0xa9a6a3626993d487d2dbda3173cf58ca1a9d9e9f#writeProxyContract, downloaded from the internet on Feb. 9, 2024, 3 pages.

* cited by examiner

Add cryptocurrency addresses — 405

Add crypto addresses to receive payments using this domain. How it works

C1 — Enter your address
C2 — 0x1443db14ffc517d916b67ad67eabb83f193c3dec — 410
C3 — Enter your address
C4 — Enter your address
C5 — 0x0000000000000000000000
C6 — ☐ T1 0x1443db14ffc517d916b67ad67eabb83f193c3dec  Verify ▶ — 415
T2 Enter your address
T3 0x1443db14ffc517d916b67ad67eabb83f193c3dec + Add Currency — 420

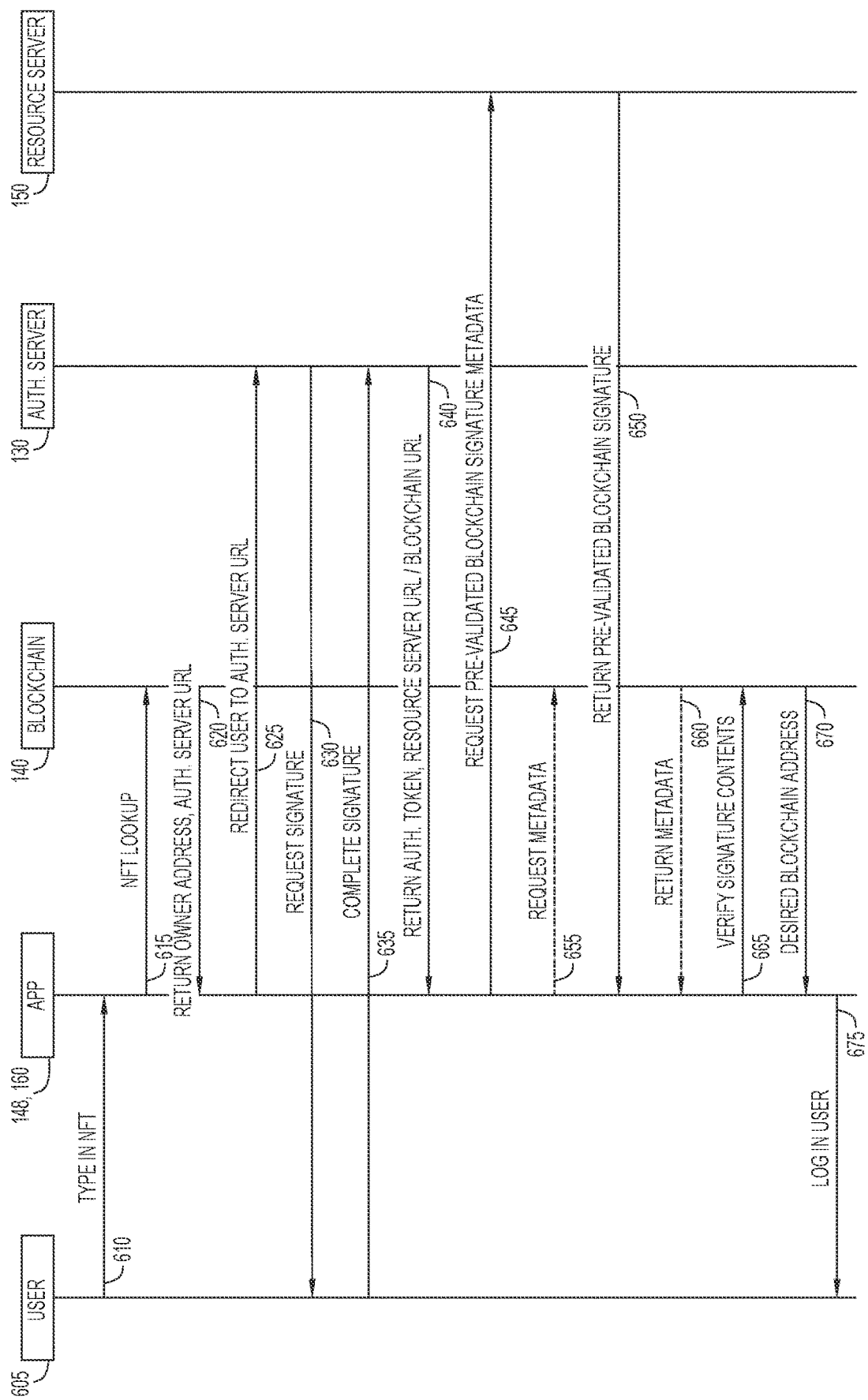

CROSS CHAIN ACCESS GRANTING TO APPLICATIONS

BACKGROUND

1. Technical Field

Present invention embodiments relate to computer security, and more specifically, to granting access to applications associated with different blockchains based on using a non-fungible token (NFT) as a login credential to verify a user.

2. Discussion of the Related Art

Users of distributed or decentralized applications (dApps) for Web3 use their blockchain wallet address as a login credential. Web3 generally refers to a decentralized version of the web (or Internet) based on blockchains and peer-to-peer networks. The login process requires a user to sign a message generated by a distributed application (dApp) using a private key associated with a user blockchain wallet address. This private key is only known by the user and encrypts the message to generate a signature. The distributed application (dApp) subsequently verifies the signature with a known user public key. Signature verification proves the user owns the blockchain wallet address, and gives the distributed application (dApp) confidence to associate the blockchain wallet address with a user login request.

Usage of public key encryption to prove cryptographic ownership has been used for many security architectures. However, a complicated and non-standardized login process is employed for Web3 due to the availability of many blockchains, each with their own blockchain wallet address, domains, and requirements. A typical Web3 user may possess blockchain wallet addresses across multiple blockchains, as well as multiple blockchain wallet addresses on the same blockchain. Each of these unique blockchain wallet addresses could potentially be used as a login credential for a distributed application (dApp).

Ownership of multiple blockchain wallet addresses across multiple blockchains provides a difficult user experience for a distributed application (dApp) login. While in some ways managing a set of blockchain wallet addresses is similar to managing a set of traditional usernames/passwords, there are key differences which complicate matters in a Web3 cryptographic space. In particular, blockchain wallet addresses and keys are not designed to be human readable, and signatures must be generated by cryptographic software (and cannot simply be typed with a keyboard as is the case for a username/password). Further, each blockchain has a unique set of cryptographic software that must be used to generate signatures. The cryptographic software and private keys used to generate a signature are not easily portable between devices, and the cryptographic software may not be compatible with a multitude of devices (e.g. desktop computer, tablet, mobile phone, operating system, etc.). Moreover, private keys cannot be changed once a public/private key-pair is generated.

In addition, centralized password managers are problematic in the Web3 cryptographic space since storage of a static string (e.g., password, application programming interface (API) key, etc.) is not sufficient to validate ownership of a resource across blockchains. A message must be generated and signed by a user private key.

Accordingly, managing blockchain address keypairs has greater complexity relative to managing usernames and passwords. Login options presented to a user by distributed applications (dApps) differ greatly depending on the blockchain technology supported by the distributed application (dApp) and the cryptographic software available on a user device.

SUMMARY

According to one embodiment of the present invention, a system for granting access to applications associated with different blockchains comprises one or more memories and at least one processor coupled to the one or more memories. The system verifies a non-fungible token of a first blockchain is owned by a user. The non-fungible token is indicated by the user for access to an application associated with a second blockchain. Information for the second blockchain is retrieved from information for different blockchains associated with the non-fungible token. A blockchain address of the second blockchain is verified as being associated with the user based on the information for the second blockchain to grant access to the application. Embodiments of the present invention further include a method and computer program product (e.g., including one or more computer readable media with instructions executable by one or more processors) for granting access to applications associated with different blockchains in substantially the same manner described above.

BRIEF DESCRIPTION OF THE DRAWINGS

Generally, like reference numerals in the various figures are utilized to designate like components.

FIG. 4 is an example graphical user interface for verifying blockchain (or wallet) addresses of various blockchains according to an embodiment of the present invention.

FIG. 6 is a flow diagram of a method of performing a login for an application associated with a blockchain based on a non-fungible token (NFT) according to an embodiment of the present invention.

DETAILED DESCRIPTION

Ownership of multiple blockchain (or wallet) addresses across multiple blockchains provides a difficult user experience for a distributed application (dApp) login. For example, distributed applications (dApps) associated with different blockchains may have different login processes and/or different manners of signing messages. While in some ways managing a set of blockchain addresses is similar to managing a set of traditional usernames/passwords, there are key differences which complicate matters in a Web3 cryptographic space. Web3 generally refers to a decentralized version of the web (or Internet) based on blockchains and peer-to-peer networks. Further, centralized password managers are problematic in the Web3 cryptographic space since storage of a static string (e.g., password, application programming interface (API) key, etc.) is not sufficient to validate ownership of a resource across blockchains. A message must be generated and signed by a user private key.

Since managing blockchain (or wallet) address keypairs has greater complexity relative to managing usernames and passwords, login options presented to a user by distributed applications (dApps) differ greatly depending on the blockchain technology supported by the distributed application (dApp) and cryptographic software available on a user device.

Accordingly, an embodiment of the present invention provides cross-blockchain login technology that enables a standardized compatible login requirement to be shared across a set of distributed or decentralized applications (dApps). The present invention embodiment provides a blockchain (or wallet) address verification that enables a distributed (dApp) or other application to present substantially the same login process to users, regardless of the underlying blockchain technology or software available on the user device. The verification process is a decentralized approach that avoids storing private information in a centralized service.

An embodiment of the present invention uses owner-controlled non-fungible token (NFT) metadata on a first blockchain to store blockchain (or wallet) address verification details about other blockchains. A non-fungible token (NFT) is a crypto type asset with each token being unique (and representing items, such as digital art, music, or video game items), whereas fungible tokens (e.g., coins of the same cryptocurrency) have the same value of worth and are exchangeable. When a user can prove ownership of the non-fungible token (NFT) that exists on the first blockchain, derived ownership of blockchain (or wallet) addresses on the other blockchains can be obtained from the metadata on the first blockchain by a distributed or decentralized application (dApp) or other application.

Figure 1:
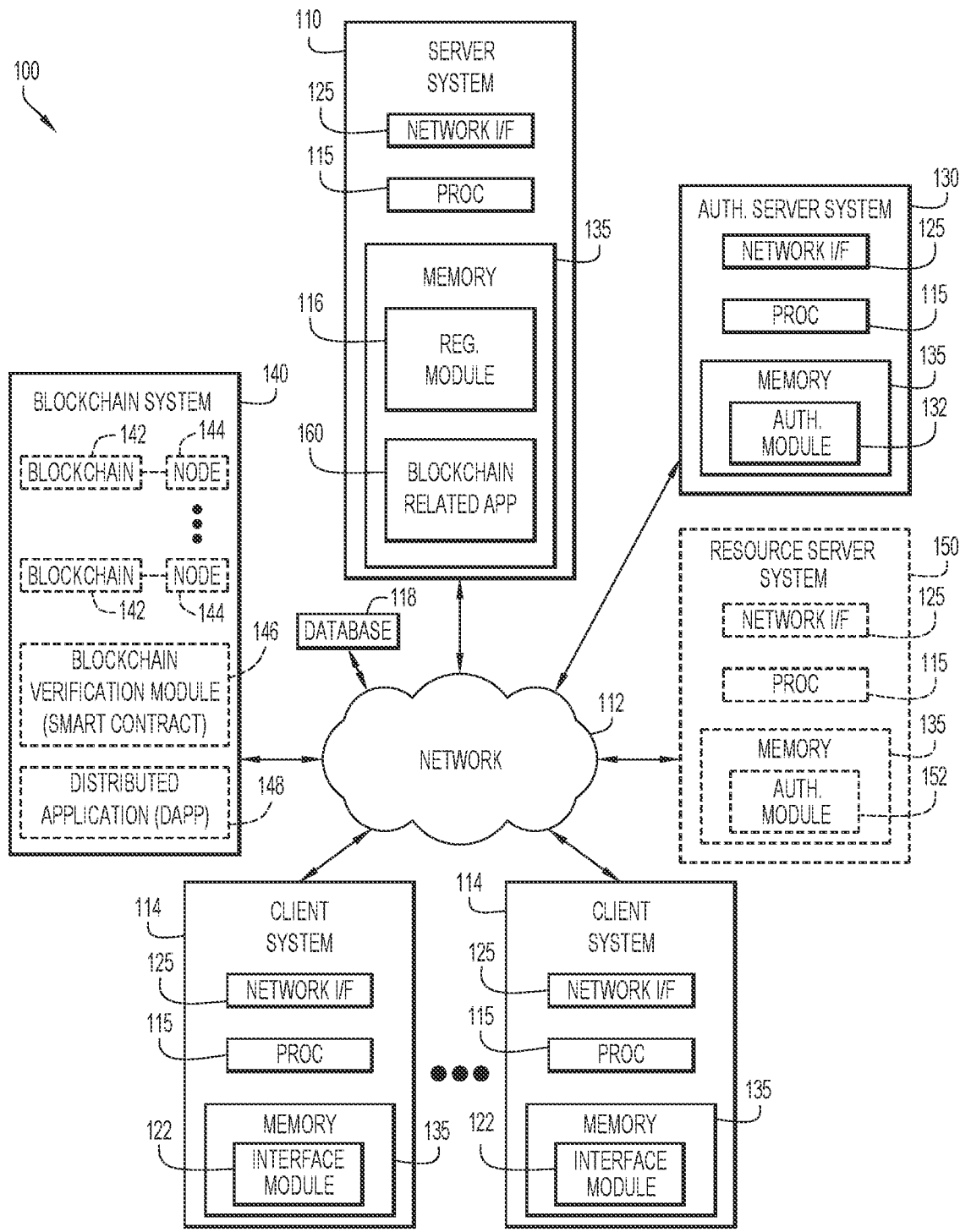
FIG. 1 is a diagrammatic illustration of an example computing environment according to an embodiment of the present invention.

An example environment 100 for use with present invention embodiments is illustrated in FIG. 1. Specifically, environment 100 includes one or more server systems 110, one or more client or end-user systems 114, one or more authentication server systems 130, and one or more blockchain systems 140 each implementing and maintaining at least one corresponding blockchain 142. Environment 100 may further include one or more resource server systems 150. Server systems 110, client systems 114, authentication server systems 130, blockchain systems 140, and/or resource server systems 150 may be remote from each other and communicate over a network 112. The network may be implemented by any number of any suitable communications media (e.g., wide area network (WAN), local area network (LAN), Internet, Intranet, etc.). Alternatively, server systems 110, client systems 114, authentication server systems 130, blockchain systems 140, and/or resource server systems 150 may be local to each other, and communicate via any appropriate local communication medium (e.g., local area network (LAN), hardwire, wireless link, Intranet, etc.).

Server systems 110 include a registration module 116 that interfaces with a user via client system 114 to perform blockchain or other domain name registration and/or manage crypto or other assets for users. Client systems 114 may include an interface module 122 to provide a graphical user (e.g., GUI, etc.) or other interface (e.g., command line prompts, menu screens, etc.) that enables users to access server systems 110 for registering blockchain or other domain names and/or managing crypto or other assets. The interface module may include any conventional or other browser to access server systems 110.

Authentication server systems 130 include an authentication module 132 that authenticates a user as an owner of a provided non-fungible token (NFT). The non-fungible token (NFT) may correspond to various items including a blockchain or other domain name, digital art, music, video game items, etc. The authentication module may process requests from any entities (e.g., user, application, service, computing or other device, etc.).

Blockchain systems 140 may each include one or more nodes 144 to implement and maintain at least one corresponding blockchain 142. The nodes may be implemented by any suitable computing devices (e.g., as described below for FIG. 2). The blockchain is generally in the form of a ledger that includes a series of records or blocks chained or linked together. The blockchain is typically managed by a peer-to-peer network (of nodes 144) and used as a distributed ledger. Nodes 144 of the peer-to-peer network communicate and verify new blocks according to a protocol. The peer-to-peer network provides a decentralized approach, where each node has a copy of a blockchain 142. Transactions are transmitted to the peer-to-peer network, where mining nodes (nodes 144) process the transactions. The mining nodes validate a transaction, insert the transaction into a current block, and transmit the block to the other nodes. Blockchain 142 may be implemented by any conventional or other blockchain, and may be a public (e.g., no access restrictions, etc.), private (e.g., restricted access, etc.), or hybrid (e.g., with centralized and decentralized features) blockchain.

Blockchain systems 140 include a blockchain verification module 146 that enables verification of a user for various blockchains. The blockchain verification module is preferably implemented as a smart contract for a blockchain 142 (e.g., associated with a non-fungible token (NFT) of a user, etc.), and executed by one or more nodes 144. A smart contract is basically software stored on a blockchain that executes in response to occurrence of pre-defined conditions. The code and data for the smart contract reside at a specific address on the blockchain.

Blockchain systems 140 may further include one or more distributed or decentralized applications (dApps) 148 to perform various operations (e.g., financial or other transactions related to a blockchain, etc.). The distributed applications (dApps) enable users of various blockchains to log in to the distributed applications (dApps) via substantially the same login process in accordance with embodiments of the present invention as described below. Blockchain verification module 146 and distributed applications (dApps) 148 may be on the same or different blockchain systems 140.

Interface module 122 of client systems 114 may further provide a graphical user (e.g., GUI, etc.) or other interface (e.g., command line prompts, menu screens, etc.) that enables users to access distributed applications (dApps) 148 on blockchain systems 140 for performing various operations (e.g., financial or other transactions related to a blockchain, etc.). The interface module may include any conventional or other browser to access the distributed applications (dApps) of blockchain systems 140. The interface module may natively, or include extensions to, access the distributed applications (dApps). The interface module may provide a user interface to serve as a front end for a distributed application (dApp) 148, where back end processing for the distributed application (dApp) is performed on a blockchain system 140. Client systems 114 may further provide reports or notifications pertaining to requests from users (e.g., results of an access request, verification results, etc.).

Alternatively, server systems 110 may further include one or more blockchain related applications 160 for performing various operations (e.g., financial or other transactions related to a blockchain, etc.). Registration module 116 and blockchain related applications 160 may be on the same or different server systems 110. In this case, interface module 122 may further provide a graphical user (e.g., GUI, etc.) or other interface (e.g., command line prompts, menu screens, etc.) that enables users to access blockchain related applications 160 on server systems 110 for performing the various operations (e.g., financial or other transactions related to a blockchain, etc.). The interface module may include any conventional or other browser to access server systems 110.

Resource server systems 150 include a data module 152 that may store and retrieve metadata associated with verifications of users for various blockchains. The resource server systems provide off-chain storage and access for the metadata.

A database system 118 may store various information for the user verification (e.g., login results, metadata associated with blockchain verifications, mappings of non-fungible tokens (NFTs) to blockchains, etc.). The database system may be implemented by any conventional or other database or storage unit, may be local to or remote from server systems 110, client systems 114, authentication server systems 130, blockchain systems 140, and/or resource server systems 150 and may communicate via any appropriate communication medium (e.g., local area network (LAN), wide area network (WAN), Internet, hardwire, wireless link, Intranet, etc.).

Server systems 110, client systems 114, authentication server systems 130, and resource server systems 150 may be implemented by any conventional or other computer systems preferably equipped with a display or monitor, a base, optional input devices (e.g., a keyboard, mouse or other input device), and any software for use by present invention embodiments (e.g., server/communications software, blockchain software, registration module 116, interface module 122, authentication module 132, data module 152, blockchain related applications 160, etc.). The base may include at least one hardware processor 115 (e.g., microprocessor, controller, central processing unit (CPU), etc.), one or more memories 135, and/or internal or external network interfaces or communications devices 125 (e.g., modem, network cards, etc.)).

Registration module 116, interface module 122, authentication module 132, data module 152, blockchain verification module 146, distributed applications (dApps) 148, and blockchain related applications 160 may include one or more modules or units to perform the various functions of present invention embodiments described below. The various modules (e.g., registration module 116, interface module 122, authentication module 132, data module 152, blockchain related applications 160, etc.) may be implemented by any combination of any quantity of software and/or hardware modules or units, and may reside within memory 135 of the server and/or client systems for execution by a corresponding processor 115. The various modules of the blockchain (e.g., blockchain verification module 146, distributed applications (dApps) 148, etc.) may be implemented by any combination of any quantity of software and/or hardware modules or units, and may reside on a blockchain 142 for execution by one or more nodes 144.

Figure 2:
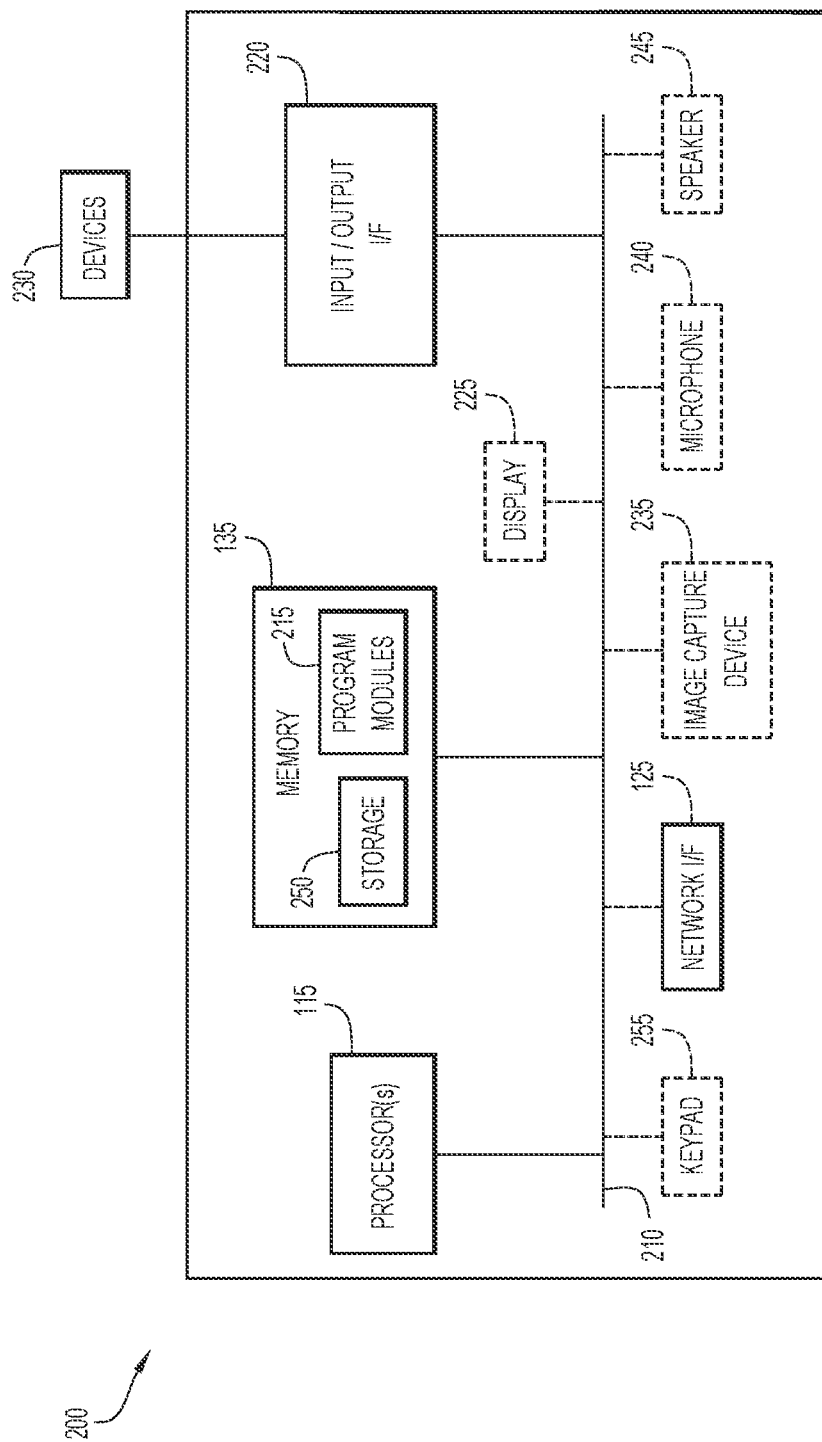
FIG. 2 is a block diagram of an example computing device according to an embodiment of the present invention.

An example of a computing device 200 for environment 100 (e.g., implementing server systems 110, client systems 114, authentication server systems 130, blockchain systems 140, nodes 144, resource server systems 150, etc.) is illustrated in FIG. 2. The example computing device may perform the functions of present invention embodiments described herein. Computing device 200 may be implemented by any personal or other type of computer or processing system (e.g., desktop, laptop, hand-held device, smartphone or other mobile device, etc.), and may be used for any computing environments (e.g., cloud computing, client-server, network computing, mainframe, stand-alone systems, etc.).

Computing device 200 may include one or more processors 115 (e.g., microprocessor, controller, central processing unit (CPU), etc.), network interface 125, memory 135, a bus 210, and an Input/Output interface 220. Bus 210 couples these components for communication, and may be of any type of bus structure, including a memory bus or memory controller, a peripheral bus, and a processor or local bus using any of a variety of conventional or other bus architectures. Memory 135 is coupled to bus 210 and typically includes computer readable media including volatile media (e.g., random access memory (RAM), cache memory, etc.), non-volatile media, removable media, and/or non-removable media. For example, memory 135 may include storage 250 containing nonremovable, non-volatile magnetic or other media (e.g., a hard drive, etc.). The computing device may further include a magnetic disk drive and/or an optical disk drive (not shown) (e.g., CD-ROM, DVD-ROM or other optical media, etc.) connected to bus 210 via one or more data interfaces.

Moreover, memory 135 includes a set of program modules 215 (e.g., corresponding to registration module 116, interface module 122, authentication module 132, data module 152, blockchain software (e.g., blockchain verification module 146, distributed applications (dApp) 148, blockchain management software, etc.), blockchain related applications 160, network site or service software, etc.) that are configured to perform functions of present invention embodiments described herein. The memory may further include an operating system, at least one application and/or other modules, and corresponding data. These may provide an implementation of a networking environment.

Input/Output interface 220 is coupled to bus 210 and communicates with one or more peripheral or external devices 230 (e.g., a keyboard, mouse or other pointing device, a display, biometric sensing devices, etc.), at least one device that enables a user to interact with computing device 200, and/or any device (e.g., network card, modem, etc.) that enables computing device 200 to communicate with one or more other computing devices. Computing device 200 may communicate with one or more networks (e.g., a local area network (LAN), a wide area network (WAN), a public network (e.g., the Internet), etc.) via network interface 125 coupled to bus 210.

With respect to certain entities (e.g., client system 114, etc.), computing device 200 may further include, or be coupled to, a touch screen or other display 225, a camera or image capture device 235, a microphone or other sound sensing device 240, a speaker 245 to convey sound, and/or a keypad or keyboard 255 to enter information (e.g., alphanumeric information, etc.). These items may be coupled to bus 210 or Input/Output interface 220 to transfer data with other elements of computing device 200.

Initially, a blockchain (e.g., blockchain 142, etc.) is generally in the form of a ledger that includes a series of records or blocks chained or linked together. Each block includes a hash of the prior block in the blockchain, a timestamp, and transaction information. The hash of the prior block enables the blockchain to be resistant to modification since changes to data in any prior block alter the hash value which propagates to subsequent blocks.

A blockchain is typically managed by a peer-to-peer network and used as a distributed ledger. Nodes of the peer-to-peer network communicate and verify new blocks according to a protocol. The peer-to-peer network provides a decentralized approach, where each node has a copy of the blockchain. Transactions are transmitted to the network, where mining nodes process the transactions. The mining nodes validate a transaction, insert the transaction into a current block, and transmit the block to the other nodes. Various consensus approaches may be used for combining validation results of different mining nodes to determine validity of a transaction (or block).

Users of transactions for the blockchain are authenticated based on cryptographic keys. These keys identify a user and provide access to a user account or wallet. The user wallet is basically an application or software that enables users to store and access digital assets (e.g., for receiving or sending cryptocurrency or other fungible tokens, non-fungible tokens (NFTs), etc.). For example, a non-fungible token (NFT) is a crypto type asset with each token being unique (and representing items, such as digital art, music, or video game items), whereas fungible tokens (e.g., coins of the same cryptocurrency) have the same value of worth and are exchangeable. Each user is associated with their own private key (e.g., accessible only to the associated user, etc.) and a public key (e.g., typically an address on the blockchain). The private and public keys enable authentication of the user based on digital signatures in order to commence a transaction. The user account or wallet typically stores the private key.

For example, in order for the user to send cryptocurrency, a message for a transaction is encrypted with the private key of the user wallet. The private key enables only the user to control the user wallet. A digital signature is created by encrypting the message with the private key, where the digital signature is used to verify the user and transaction. The message may be decrypted with the corresponding public key of the user wallet. Since the private key is unique to the user, successful decryption of the message with the corresponding public key verifies the message was sent by the user. Once verified, the transaction may be posted to the blockchain, thereby adjusting the user wallet based on the transaction.

In addition, a blockchain may store software (e.g., typically referred to as smart contracts) that executes in response to occurrence of pre-defined conditions. A smart contract is generally software or a program that runs on the blockchain. The code and data for the smart contract reside at a specific address on the blockchain. Non-fungible tokens (NFTs) are controlled by smart contracts that handle transference and verification of ownership of the non-fungible tokens (NFTs). A blockchain may be public (e.g., no access restrictions, etc.), private (e.g., restricted access, etc.), or hybrid (e.g., with centralized and decentralized features).

A blockchain domain name is stored on a blockchain. The blockchain domain name may be a non-fungible token (NFT) domain name that is associated with a non-fungible token (NFT) stored in a user wallet. The blockchain domain name may be associated with various information (e.g., wallet addresses, user information (e.g., name, address, email, etc.), data or other access restrictions, etc.). The blockchain domain name is associated with software or smart contracts on the blockchain that may perform various functions (e.g., provide a registry for corresponding wallet addresses, indicate locations of content for the domain (e.g., or a website, etc.) hosted on the blockchain or other system, etc.). In order to access a blockchain domain, the blockchain is accessed to find the record corresponding to the blockchain domain name (which may initiate the corresponding smart contracts for the corresponding functionality). The private key of the user wallet enables the user to have sole control of the blockchain domain name (e.g., authenticating operations or transactions for the blockchain domain name similar to the cryptocurrency example described above, etc.). For example, the user may have sole control to perform operations that alter content and/or functionality for the blockchain domain name.

Figure 3:
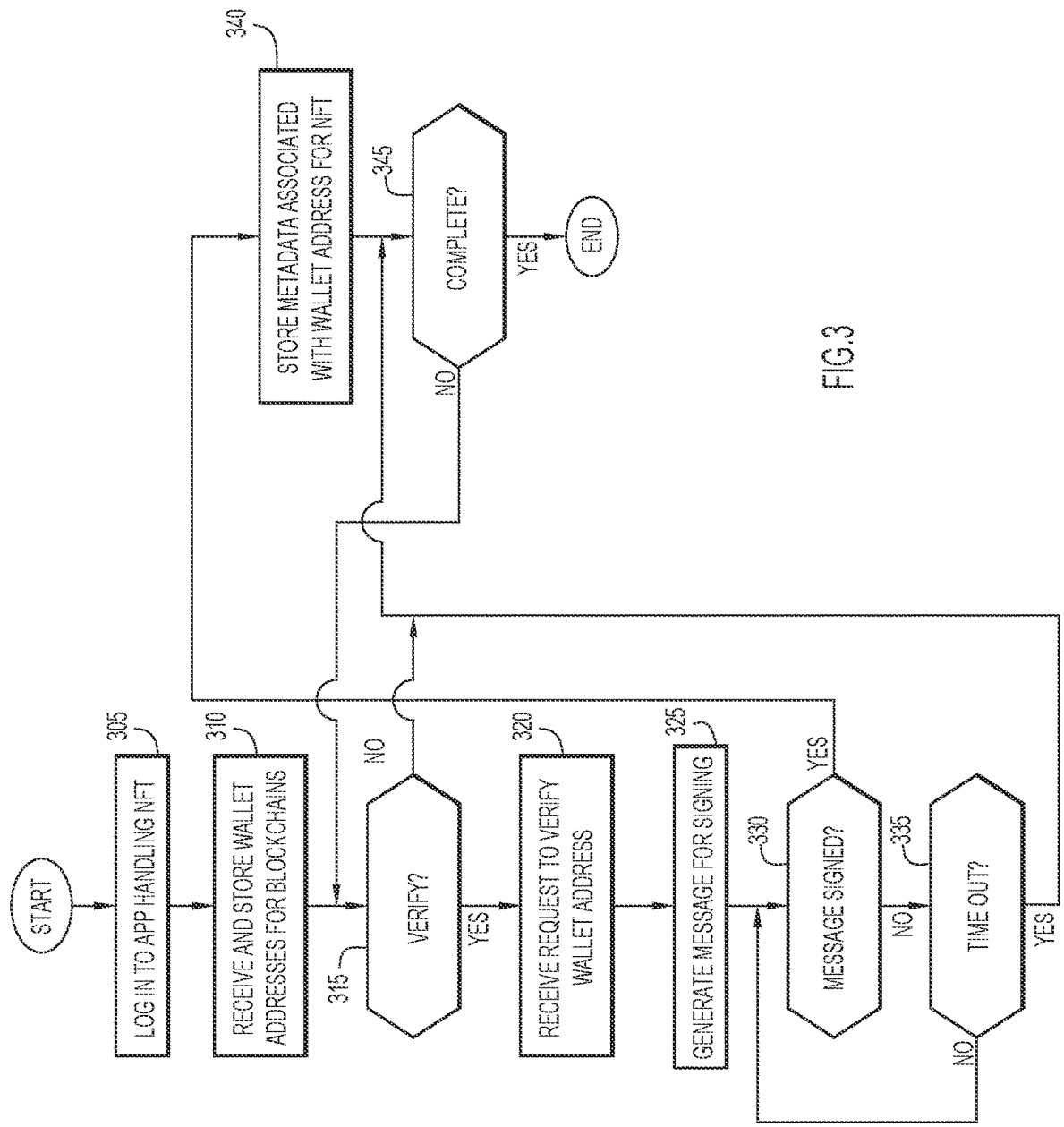
FIG. 3 is a flowchart of a method of verifying and generating metadata for blockchain (or wallet) addresses of various blockchains according to an embodiment of the present invention.

A method of verifying and generating metadata for blockchain (or wallet) addresses of various blockchains (e.g., via registration module 116, blockchain verification module 146, blockchain system 140, and server system 110 and/or client system 114) according to an embodiment of the present invention is illustrated in FIG. 3. Initially, a user desires to log in to a distributed application (dApp) 148 on a blockchain 142 or a blockchain related application 160 on a server system 110. Applications 148, 160 are associated with blockchains that initially may not be supported by the login technique of present invention embodiments. For example, the user may not have a verified blockchain (or wallet) address for the blockchain associated with distributed application (dApp) 148 or blockchain related application 160.

The user logs in to registration module 116 of server system 110 that handles crypto or other assets (e.g., fungible and/or non-fungible tokens (NFTs), etc.) of the user at operation 305. The login may use any conventional or other process (e.g., username/password, wallet verification, etc.). The registration module may maintain a user profile for a user that contains various user information (e.g., name, mailing address, email address, blockchain (or wallet) addresses of the user for various blockchains, etc.). The registration module may enable the user to register blockchain or other domain names, update the user profile, and/or manage crypto or other assets. For example, the registration module may enable the user to add blockchain (or wallet) addresses of various blockchains to the user profile at operation 310. The user profile may contain or be updated with a blockchain address for a blockchain associated with distributed application (dApp) 148 or blockchain related application 160.

The user may indicate a blockchain (or wallet) address for verification by actuating a verify actuator adjacent a corresponding blockchain address in a display of the user profile and providing a name of a non-fungible token (NFT) to associate with the indicated blockchain address. The non-fungible token (NFT) may correspond to various items owned by, or within a wallet of, the user (e.g., blockchain or other domain name, digital art, music, video game items, etc.). The name of a non-fungible token (NFT) may include any quantity of terms, words, tokens, or arrangements of any quantity of any types of elements (e.g., alphanumeric or other characters, symbols, numbers, etc.). The name preferably includes a name portion and an optional extension (e.g., "name.nft", etc.). Alternatively, the name may include the name portion without the extension. The name portion and extension may each include any quantity of terms, words, tokens, or arrangements of any quantity of any types of elements (e.g., alphanumeric or other characters, symbols, numbers, etc.).

Referring to FIG. 4, an example graphical user interface 400 presents a portion of a user profile pertaining to wallets for various cryptocurrencies or blockchains. Interface 400 includes a plurality of address fields 405, each corresponding to a wallet address for a corresponding cryptocurrency (or blockchain). A verified indicator 410 may be placed adjacent wallet addresses that have been verified (e.g., as shown by the check mark in FIG. 4). When an address for a wallet is entered by a user in an address field 405 and has not been verified, a verify actuator or button 415 may be displayed adjacent that field. The verify actuator enables entry of a name for a non-fungible token (NFT) associated with the corresponding wallet address, and verification of the corresponding wallet address as described below. For example, wallet addresses associated with cryptocurrencies C2 and C6 (for token types T1 and T3) (e.g., as shown in FIG. 4) are presented with a verified indicator 410 (e.g., a check mark, etc.) to indicate those addresses have been verified for the corresponding blockchains. The wallet address entered for currency C5 has not been verified, and a verify actuator or button 415 is presented to enable the user to initiate the verification process. An add actuator or button 420 is presented to enable a user to add cryptocurrencies and corresponding address fields. Accordingly, registration module 116 maintains a user profile that may contain blockchain (or wallet) addresses for various blockchains, and enables verification of those addresses.

Referring back to FIG. 3, when a user requests verification of a blockchain (or wallet) address in the user profile (e.g., actuates a verify actuator as described above) as determined at operation 315, registration module 116 requests a name of a non-fungible token (NFT) from the user to associate with the blockchain address, and directs blockchain verification module 146 of blockchain system 140 to verify the blockchain address. The blockchain verification module stores blockchain verification data as metadata associated with an owner of the non-fungible token (NFT). For example, the blockchain verification data may be stored on a blockchain as immutable metadata associated with a user profile of the owner of the non-fungible token (NFT).

In particular, blockchain verification module 146 receives a request to verify the blockchain (or wallet) address from registration module 116 at operation 320. The request may include information for the verification. The blockchain verification module generates a unique message for signing by the user at operation 325. The message may include various information in the payload, including the name of the non-fungible token (NFT), a blockchain address for an owner wallet containing the non-fungible token (NFT), a target blockchain type, a target blockchain address, and a salt (e.g., a random nonce for enhanced encryption and recreating a signature). The target blockchain pertains to the blockchain associated with the blockchain (or wallet) address requested for verification from registration module 116. The information for generating the message may be received from registration module 116 in the request (e.g., name of the non-fungible token (NFT), a blockchain address for an owner wallet containing the non-fungible token (NFT), a target blockchain type, a target blockchain address, etc.) and/or ascertained from information retrieved from a corresponding blockchain for the non-fungible token (NFT) based on the name (e.g., a blockchain address for an owner wallet containing the non-fungible token (NFT), etc.).

Blockchain verification module 146 sends the message to the blockchain (or wallet) address of the target blockchain for the user to sign. The user logs in or otherwise accesses the wallet of the target blockchain (e.g., via a username and password, wallet verification, etc.) in order to sign the message and verify the user. Blockchain verification module 146 monitors the wallet until a successful verification is detected or a time out has occurred (e.g., a time interval has expired, etc.) as determined at operations 330 and 335. The time out may be a predetermined time interval sufficient to enable the user to perform the signing, and preferably in a range from one through five minutes. However, any time interval may be used for the time out.

By way of example, signing of the message in the wallet generates a digital signature of the message based on the private key of the wallet. The signed message or digital signature is decrypted for verification by blockchain verification module 146 based on a public key corresponding to the wallet (e.g., blockchain (or wallet) address, etc.). Since the private key is unique to the wallet, successful decryption of the message with the corresponding public key verifies the message was signed by the user.

When the verification is successful prior to occurrence of the timeout (e.g., expiration of the predetermined time interval, etc.) as determined at operation 330, the user is determined to be associated with the blockchain (or wallet) address. Blockchain verification module 146 stores metadata associated with the blockchain (or wallet) address at operation 340. The metadata may include various information. For example, the metadata may include the original message used for verification (e.g., in plain text, etc.), the signed message (e.g., encrypted signature, etc.), the target blockchain type (e.g., in plain text, etc.), and the target blockchain address (e.g., in plain text, etc.). This information may be used to verify the metadata for a login process as described below. The metadata may be stored on a blockchain (e.g., publicly accessible, etc.), or on an off-chain data source (e.g., resource server system 150, database system 118, etc.). Since the metadata includes the original message indicating the name of the non-fungible token (NFT), the metadata associates the non-fungible token (NFT) with the verification of the blockchain address. In addition, the verification may be visually presented to the user (e.g., a verified indicator adjacent the blockchain (or wallet) address as described above for FIG. 4).

When the time out occurs (e.g., the predetermined time interval expires, etc.) without detecting a successful verification as determined at operation 335, the verification of the blockchain (or wallet) address fails. For example, the signed message may have failed the message verification, or the user was unable to access the wallet to sign the message prior to occurrence of the timeout (e.g., expiration of the predetermined time interval, etc.). The verification may be repeated in substantially the same manner described above until processing of verification requests is complete as determined at operation 345.

Figure 5:
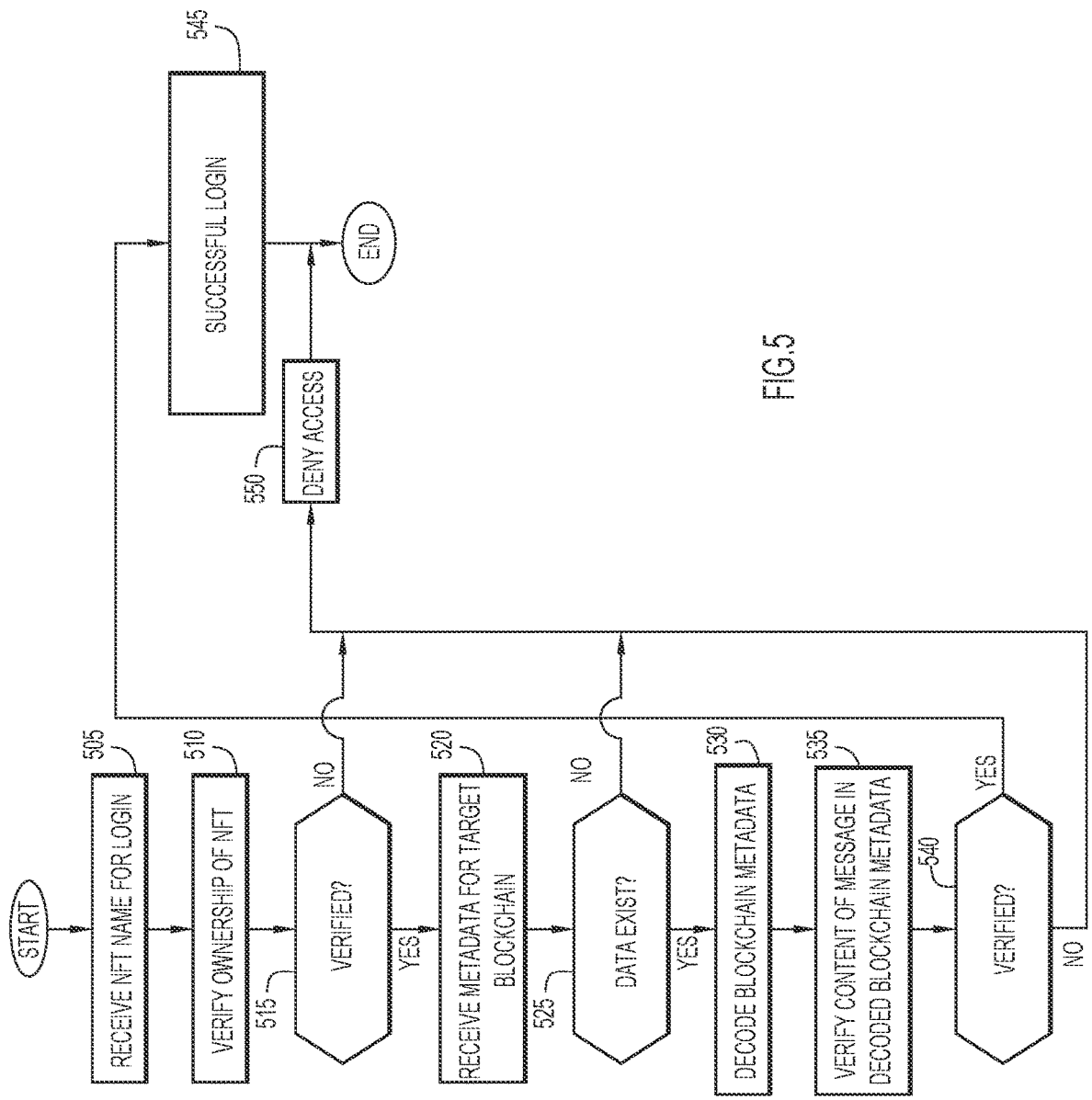
FIG. 5 is flowchart of a method of verifying a user for applications associated with various blockchains based on a non-fungible token (NFT) according to an embodiment of the present invention.

A method of verifying a user for various blockchains based on a non-fungible token (NFT) (e.g., via data module 132, blockchain verification module 146, distributed application (dApp) 148 or blockchain related application 160, authentication system 130, blockchain system 140, and server system 110, client system 114, and/or resource server system 150) according to an embodiment of the present invention is illustrated in FIG. 5. Initially, an application (e.g., distributed application (dApp) 148 of a blockchain system 140 or a blockchain related application 160 of a server system 110) employs a login process for users of client systems 114 that is substantially the same for different applications regardless of the underlying blockchain technology associated with those applications. In particular, a user may access the application from a client system 114 (e.g., via interface module 122). The application is associated with a blockchain, and prompts the user for a human readable name of a non-fungible token (NFT) for the login process. In other words, the application requests a name of a non-fungible token (NFT) for a user login, instead of credentials for the associated blockchain (e.g., a blockchain (or wallet) address for the associated blockchain, etc.).

The application receives the name of the non-fungible token (NFT) at operation 505. The non-fungible token (NFT) may correspond to various items owned by, or within a wallet of, the user (e.g., blockchain or other domain name, digital art, music, video game items, etc.). Further, the name of a non-fungible token (NFT) may include any quantity of terms, words, tokens, or arrangements of any quantity of any types of elements (e.g., alphanumeric or other characters, symbols, numbers, etc.). The name preferably includes a name portion and an optional extension (e.g., "name.nft", etc.). Alternatively, the name may include the name portion without the extension. The name portion and extension may each include any quantity of terms, words, tokens, or arrangements of any quantity of any types of elements (e.g., alphanumeric or other characters, symbols, numbers, etc.).

The application verifies ownership of the non-fungible token (NFT) provided by the user at operation 510. This may be accomplished using conventional or other public/private key encryption techniques. For example, the application may request authentication module 132 of authentication server system 130 to obtain a signed message from the user. In this case, the application accesses a blockchain 142 associated with the non-fungible token (NFT) (via a blockchain system 140) to obtain a blockchain (or wallet) address corresponding to the non-fungible token (NFT) provided by the user. The associated blockchain may be determined based on the name (e.g., a blockchain corresponding to an extension, etc.), a mapping of non-fungible tokens (NFTs) to blockchains, or a blockchain indication received from the user with the name of the non-fungible token (NFT). A transaction for the non-fungible token (NFT) may be identified on the associated blockchain based on the name of the non-fungible token (NFT), and the blockchain (or wallet) address for the non-fungible token (NFT) may be ascertained from information stored on the associated blockchain for the transaction.

The application provides the blockchain (or wallet) address for the non-fungible token (NFT) to authentication module 132. The authentication module generates a message that is sent to the blockchain (or wallet) address for the non-fungible token (NFT) for the user to sign in substantially the same manner described above. The signing of the message by the user verifies the user as the owner of the wallet (and the non-fungible token (NFT)). This verification enables the application to have confidence that the user owns the provided non-fungible token (NFT), where the application may continue processing of the login request asynchronously while the user waits for completion.

Once the non-fungible token (NFT) is verified as being associated with the user as determined at operation 515, the application verifies the user for the blockchain associated with the application. Initially, the application receives metadata corresponding to the non-fungible token (NFT) and including information for the blockchain associated with the application at operation 520. In the case of the metadata being stored on a blockchain 142, this may be accomplished by the application submitting a request to block verification module 146 (or smart contract) to retrieve the metadata from that blockchain. The metadata includes information about various blockchains (e.g., blockchain (or wallet) addresses, etc.) associated with the non-fungible token (NFT). The request may indicate the specific blockchain associated with the application, where the metadata pertaining to the indicated blockchain is retrieved. Blockchain verification module 146 determines a presence of information in the metadata for the blockchain associated with the application. In other words, the blockchain verification module determines whether the blockchain associated with the application has been verified for the user.

When the metadata is stored in an off-chain data source (e.g., resource server system 150, etc.), the application submits a request to block verification module 146 (or smart contract) to retrieve the metadata. The block verification module submits a request to data module 152 of a resource server system 150 to retrieve the metadata including information about various blockchains (e.g., blockchain (or wallet) addresses, etc.) associated with the non-fungible token (NFT). The request may indicate the specific blockchain associated with the application, where the metadata pertaining to the indicated blockchain is retrieved. Blockchain verification module 146 determines a presence of information in the metadata for the blockchain associated with the application. In other words, the blockchain verification module determines whether the blockchain associated with the application has been verified for the user.

When the information for the blockchain associated with the application exists in the metadata as determined at operation 525, the application verifies the information in the metadata for that blockchain. Initially, the application decodes content of the signed message in the retrieved metadata to verify the signed message at operation 530. For example, the metadata may include the original message (e.g., in plain text, etc.) used for verification of the user for the blockchain associated with the application (e.g., the name of the non-fungible token (NFT), the blockchain address of the owner of the wallet containing the non-fungible token (NFT), the target blockchain type, the target blockchain address, salt, etc.), the signed message (e.g., encrypted signature, etc.), the target blockchain type, and the target blockchain address as described above.

The application decodes the signed message in the metadata for the blockchain associated with the application using the target blockchain address. In this case, the signature for the signed message includes the original message encrypted by a user private key which is decoded by the corresponding public key (or target blockchain address) as described above. The application compares contents of the decoded message to the original message in the metadata at operation 535. The information is verified when content of the decoded message matches content of the original message in the metadata, and the decoded message contains the name of the non-fungible token (NFT) provided by the user and the corresponding blockchain address of the owner of the non-fungible token (NFT). Thus, the login process provides a two key (or wallet) authentication. The first key pertains to the private key of the wallet containing the non-fungible token (NFT) and the second key pertains to the private key of the wallet for the blockchain associated with the application. Verification of the metadata requires a user to be in possession of, or own, both of those private keys.

Once the information of the metadata is verified as determined at operation 540, the application notifies the user (via client system 114) of a successful login at operation

545. The blockchain (or wallet) address of the blockchain associated with the application is extracted from the retrieved metadata and used as login credentials (along with verification of the metadata) for the application to grant access to the user. Thus, the application may successfully determine ownership of a blockchain address for the blockchain associated with the application based on user ownership of the non-fungible token (NFT) on the same or another blockchain.

When the user is not verified as the owner of the non-fungible token (NFT) at operation 515, the information for the blockchain associated with the application is absent from the metadata at operation 525, or the information of the metadata is not verified as determined at operation 540, the application notifies the user (via client system 114) of an unsuccessful login and access is denied at operation 550. The user may repeat the login process for a same or different non-fungible token (NFT) or blockchain (or wallet) address in substantially the same manner described above.

A method of performing a login for an application associated with a blockchain based on a non-fungible token (NFT) (e.g., via data module 132, blockchain verification module 146, distributed application (dApp) 148 or blockchain related application 160, authentication system 130, blockchain system 140, and server system 110, client system 114, and/or resource server system 150) according to an embodiment of the present invention is illustrated in FIG. 6. Initially, a user 605 may create or update a user profile with blockchain (or wallet) addresses for various blockchains. The user profile may be for a user account providing management of crypto or other assets. These addresses may be verified and associated with non-fungible tokens (NFTs), and metadata for the addresses may be stored on a blockchain 142 or an off-chain data source (e.g., a resource server system 150, etc.) in substantially the same manner described above (e.g., for FIG. 3).

An application (e.g., distributed application (dApp) 148 of a blockchain system 140 or a blockchain related application 160 of a server system 110) enables user 605 of a client system 114 to log in to the application. The login process is substantially the same for different applications regardless of the underlying blockchain technology associated with those applications. In particular, user 605 may access the application from a client system 114 (e.g., via interface module 122). The application is associated with a blockchain, and prompts the user for a human readable name of a non-fungible token (NFT). The user provides the name of the non-fungible token (NFT) (via client system 114) to the application at flow 610. In other words, the application requests a name of a non-fungible token (NFT) for a user login, instead of credentials for the associated blockchain (e.g., a blockchain (or wallet) address for the associated blockchain, etc.).

The non-fungible token (NFT) may correspond to various items owned by, or within a wallet of, the user (e.g., blockchain or other domain name, digital art, music, video game items, etc.). Further, the name of a non-fungible token (NFT) may include any quantity of terms, words, tokens, or arrangements of any quantity of any types of elements (e.g., alphanumeric or other characters, symbols, numbers, etc.). The name preferably includes a name portion and an optional extension (e.g., "name.nft", etc.). Alternatively, the name may include the name portion without the extension. The name portion and extension may each include any quantity of terms, words, tokens, or arrangements of any quantity of any types of elements (e.g., alphanumeric or other characters, symbols, numbers, etc.).

The application accesses a blockchain 142 associated with the non-fungible token (NFT) (via a blockchain system 140), and performs a lookup for the name of the non-fungible token (NFT) at flow 615. The associated blockchain may be determined based on the name (e.g., a blockchain corresponding to an extension, etc.), a mapping of non-fungible tokens (NFTs) to blockchains, or a blockchain indication received from the user with the name of the non-fungible token (NFT). For example, a transaction for the non-fungible token (NFT) may be identified on the associated blockchain based on the name of the non-fungible token (NFT), and the blockchain (or wallet) address for the non-fungible token (NFT) may be ascertained from information stored on the associated blockchain for the transaction.

The blockchain system returns a blockchain (or wallet) address of the owner of the non-fungible token (NFT) and a uniform resource locator (URL) or address of authentication server system 130 at flow 620. The application redirects user 605 (or client system 114) to the authentication server system at flow 625 to verify ownership of the non-fungible token (NFT) provided by the user. This may be accomplished using conventional or other public/private key encryption techniques. For example, the application may provide authentication module 132 of authentication server system 130 the blockchain (or wallet) address of the owner of the non-fungible token (NFT) in order to obtain a signed message from the user. In this case, the authentication module generates a message that is sent to the wallet containing the non-fungible (NFT) for the user to sign at flow 630 in substantially the same manner described above. User 605 signs the message at flow 635 by accessing a user account associated with the wallet. The signing of the message by the user verifies the user as the owner of the non-fungible token (NFT) in substantially the same manner described above.

Authentication module 132 of authentication server system 130 provides to the application a token indicating the user verification for the non-fungible token (NFT) and a uniform resource locator (URL) or address of a resource server system 150 storing metadata associated with the non-fungible token (NFT) pertaining to blockchain (or wallet) addresses of the user for other blockchains at flow 640. The application requests (via blockchain verification module 146) metadata for the non-fungible token (NFT) pertaining to the blockchain associated with the application from data module 152 of resource server system 150 at flow 645. The application further provides the token from the authentication server system to verify the user as the owner of the non-fungible token (NFT) to the resource server system. The data module retrieves and provides the requested metadata to the application (via blockchain verification module 146) at flow 650.

Alternatively, the metadata associated with the non-fungible token (NFT) and pertaining to blockchain (or wallet) addresses of the user for other blockchains may be stored on a corresponding blockchain 142 (e.g., of the non-fungible token (NFT), etc.). In this case, authentication module 132 of authentication server system 130 provides to the application a token indicating the user verification and a uniform resource locator (URL) or other indicator of a blockchain system 140 storing the metadata pertaining to the blockchain (or wallet) addresses of the user for other blockchains at flow 640. The application requests the metadata for the non-fungible token (NFT) pertaining to the blockchain associated with the application from blockchain verification module 146 of blockchain system 140 at flow 655. The application further provides the token from the authentication server system to verify the user as the owner of the non-fungible token (NFT) to the blockchain verification module. The blockchain verification module retrieves and provides the requested metadata to the application at flow 660.

The application verifies content of the signed message in the retrieved metadata for the blockchain associated with the application at flow 665. For example, the application decodes content of the signed message in the retrieved metadata in substantially the same manner described above. The information is verified when content of the decoded message matches content of the original message in the metadata, and the decoded message contains the name of the non-fungible token (NFT) provided by the user and the corresponding blockchain (or wallet) address for the non-fungible token (NFT) as described above. The blockchain (or wallet) address associated with the application (e.g., target blockchain address, etc.) is extracted from the metadata by blockchain verification module 146 of blockchain system 140, and provided to the application at flow 670. The extracted blockchain (or wallet) address is used as a login credential (along with verification of the metadata) for the application to grant access to the user.

The application notifies user 605 (via client system 114) of a successful login, and proceeds to grant access at flow 675. Thus, the application may successfully determine ownership of a blockchain address for the blockchain associated with the application based on user ownership of the non-fungible token (NFT) on the same or another blockchain. In addition, the login process provides a two key (or wallet) authentication. The first key pertains to the private key of the wallet containing the non-fungible token (NFT) and the second key pertains to the private key of the wallet for the blockchain associated with the application. Verification of the metadata requires a user to be in possession of, or own, both of these private keys.

By way of example, a conventional blockchain specific login experience provided by a distributed or other application may prompt a user to select from a multitude of wallet software specific to a given blockchain technology. The presented wallet software differs depending on an underlying blockchain technology associated with the application. Alternatively, the presented wallet software may be a superset of wallet software when multiple blockchain technologies are supported by the application. Each of the wallet software provides their own corresponding signature and signing requirements, thereby providing a difficult user login experience.

In contrast, a present invention embodiment enables an application (e.g., distributed application (dApp) 148 or blockchain related application 160) to provide a login experience where a user is prompted to enter a name of their non-fungible token (NFT) as a login input (instead of a blockchain (or wallet) address for the blockchain associated with the application). This experience is homogenous regardless of the blockchain technology associated with the application. The signature and signing requirements requested by the login process of the present invention embodiment remains substantially the same, regardless of the underlying blockchain technology. In other words, the blockchain specific details are hidden from the user in background processing.

Present invention embodiments may provide various technical and other advantages. For example, present invention embodiments enable rapid response times for login requests. For example, verification information provided by the metadata may be used to quickly validate the login request, thereby avoiding time consuming wallet or other verifications for different blockchains. This improves response times and conserves computing resources.

Further, present invention embodiments provide enhanced security for login requests. For example, the verification may use two private keys of different blockchains to verify the user. Moreover, a single asset may be used as a login credential (e.g., non-fungible token (NFT), etc.) across several different applications or blockchains, thereby streamlining access grants and providing an enhanced user experience. In addition, present invention embodiments may rely on prior verification of blockchain (or wallet) addresses of various different blockchains for login requests to applications for those blockchains, thereby avoiding significant amounts of processing, conserving processing and memory resources, and providing rapid responses.

It will be appreciated that the embodiments described above and illustrated in the drawings represent only a few of the many ways of implementing embodiments for cross chain access granting to applications. In addition, characteristics or features of embodiments of the present invention may be combined in any fashion to provide additional embodiments of the present invention.

The environment of the present invention embodiments may include any number of computer or other processing systems (e.g., client or end-user systems, server systems, blockchain systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, hand-held devices, smartphones or other mobile devices, etc.), and may include any commercially available operating system and any combination of commercially available and custom software (e.g., communications software; server software; software of present invention embodiments (including registration module 116, interface module 122, authentication module 132, blockchain verification module 146, distributed applications (dApps) 148, data module 152, blockchain related applications 160, etc.)). These systems may include any types of monitors and input devices (e.g., keyboard, mouse, voice recognition, etc.) to enter and/or view information.

It is to be understood that the software of the present invention embodiments (e.g., registration module 116, interface module 122, authentication module 132, blockchain verification module 146, distributed applications (dApps) 148, data module 152, blockchain related applications 160, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client, server, authentication, blockchain, and resource systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., registration module 116, interface module 122, authentication module 132, blockchain verification module 146, distributed applications (dApps) 148, data module 152, blockchain related applications 160, etc.) may be available on a non-transitory computer useable or readable medium (e.g., magnetic or optical mediums, magneto-optic mediums, CD-ROM, DVD, memory devices, etc.) of a stationary or portable computer program product, apparatus, or device for use with stand-alone systems or systems connected by a network or other communications medium. The computer useable or readable medium (or media) may include instructions executable by one or more processors to perform functions of present invention embodiments described herein.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., login results, metadata associated with blockchain verifications, mappings of non-fungible tokens (NFTs) to blockchains, etc.). The database system may be implemented by any number of any conventional or other databases, data stores or storage structures to store information. The database system may be included within or coupled to the server, client, service provider, and/or blockchain systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., results of an access request, verification results, name and/or other attributes of a non-fungible token (NFT), etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., results of an access request, verification results, etc.).

The present invention embodiments are not limited to the specific tasks or algorithms described above, but may be utilized for granting access to any applications, services, data sources, and/or platforms based on an asset of a user.

The present invention embodiments may process access requests from any entity (e.g., user, application, service, computing or other device, etc.), and utilize any asset of the entity (e.g., non-fungible or other token, wallet or other address, etc.) to access any computer related items (e.g., applications, services, data sources, platforms, etc.). The asset may correspond to various items (e.g., blockchain or other domain name, digital art, music, video game items, non-fungible tokens (NFTs), fungible tokens, etc.). Any name or other identifier for the asset may be used to grant access. The name or identifier may include any quantity of terms, words, tokens, or arrangements of any quantity of any types of elements (e.g., alphanumeric or other characters, symbols, numbers, etc.). The name or identifier preferably includes a name or identifier portion and an optional extension (e.g., "name.nft", etc.). Alternatively, the name or identifier may include the name or identifier portion without the extension. The name and/or extension may be used for partial or exact matching for name lookups (e.g., to obtain blockchain (or wallet) addresses and/or other attributes, etc.). The name or identifier portion and extension may each include any quantity of terms, words, tokens, or arrangements of any quantity of any types of elements (e.g., alphanumeric or other characters, symbols, numbers, etc.)

Any quantity of any blockchain attributes may be associated with the non-fungible token (NFT) or other asset. The metadata may include any information arranged in any fashion (e.g., non-fungible token or other asset name or identifier, blockchain (or wallet) addresses, encryption/decryption information, blockchain information, etc.). The metadata may be associated with a user/owner and/or any quantity of non-fungible tokens (NFTs) or other assets. The metadata may be stored on a blockchain and/or an off-chain data source. The data source may include any storage structure (e.g., decentralized storage structure or platform, blockchain storage, database, etc.). The metadata may be verified in any manner (e.g., decoding contents of the signed message, etc.). The contents of the decoded message may be used in any fashion to verify a user for the blockchain associated with the application (e.g., the decoded contents, non-fungible token (NFT), blockchain (or wallet) address, and/or other attributes may be compared to corresponding values, etc.).

The blockchain (or wallet) addresses may be verified in any manner (e.g., signing a message, user verification, encryption/decryption, username/password, etc.). Any indicator may be used to indicate a verified blockchain (or wallet) address (e.g., check mark, text, image, icon, etc.). The blockchain (or wallet) addresses or other blockchain attributes may be stored and/or associated with the user in any fashion (e.g., user profile, etc.). The user profile may include any information pertaining to the user (e.g., name, contact information, blockchain attributes, blockchain (or wallet) addresses, asset attributes, etc.).

Having described preferred embodiments of a new and improved system, method, and computer program product for granting access to applications associated with different blockchains, it is believed that other modifications, variations and changes will be suggested to those skilled in the art in view of the teachings set forth herein. It is therefore to be understood that all such variations, modifications and changes are believed to fall within the scope of present invention embodiments as defined by the appended claims.

What is claimed is:

1. A method of granting access to applications associated with different blockchains comprising:
receiving, via at least one processor, a non-fungible token of a first blockchain indicated by a user as a login credential for an application associated with a different second blockchain;
verifying, via the at least one processor, the non-fungible token is owned by the user;
retrieving, via the at least one processor, information for the different second blockchain from information for different blockchains stored in association with the non-fungible token; and
verifying, via the at least one processor, a blockchain address of the different second blockchain is associated with the user based on the information for the different second blockchain to grant access to the application based on the non-fungible token of the first blockchain.

2. The method of claim 1, wherein the non-fungible token corresponds to a blockchain domain name.

3. The method of claim 1, wherein verifying the non-fungible token comprises:
sending a message to a blockchain address of the first blockchain associated with the non-fungible token; and
detecting signing of the message by the user.

4. The method of claim 1, further comprising:
verifying, via the at least one processor, the blockchain address of the different second blockchain is associated with the user based on the user signing a message; and
storing, via the at least one processor, information pertaining to verification of the blockchain address of the different second blockchain, wherein the information pertaining to verification is associated with the non-fungible token.

5. The method of claim 4, wherein the information pertaining to verification is stored on the first blockchain.

6. The method of claim 4, wherein verifying the blockchain address of the different second blockchain comprises:
sending the message to the blockchain address of the different second blockchain; and
detecting signing of the message by the user.

7. The method of claim 6, wherein the information pertaining to verification includes the message signed by the user and the blockchain address of the different second blockchain, and verifying the blockchain address of the different second blockchain based on the information for the different second blockchain comprises:
decoding the signed message based on the blockchain address of the different second blockchain to determine content of the signed message; and
determining that the content of the signed message matches content of the message and indicates the non-fungible token and a blockchain address of the first blockchain associated with the non-fungible token.

8. The method of claim 1, further comprising:
granting access to the application, via the at least one processor, in response to verifying the blockchain address for the different second blockchain based on the information for the different second blockchain, wherein the blockchain address of the different second blockchain is used as a login credential for the application.

9. A system for granting access to applications associated with different blockchains comprising:
one or more memories; and
at least one processor coupled to the one or more memories, the at least one processor configured to:
receive a non-fungible token of a first blockchain indicated by a user as a login credential for an application associated with a different second blockchain;
verify the non-fungible token is owned by the user;
retrieve information for the different second blockchain from information for different blockchains stored in association with the non-fungible token; and
verify a blockchain address of the different second blockchain is associated with the user based on the information for the different second blockchain to grant access to the application based on the non-fungible token of the first blockchain.

10. The system of claim 9, wherein the non-fungible token corresponds to a blockchain domain name.

11. The system of claim 9, wherein verifying the non-fungible token comprises:
sending a message to a blockchain address of the first blockchain associated with the non-fungible token; and
detecting signing of the message by the user.

12. The system of claim 9, wherein the at least one processor is further configured to:
verify the blockchain address of the different second blockchain is associated with the user based on the user signing a message; and
store information pertaining to verification of the blockchain address of the different second blockchain, wherein the information pertaining to verification is associated with the non-fungible token.

13. The system of claim 12, wherein the information pertaining to verification is stored on the first blockchain.

14. The system of claim 12, wherein verifying the blockchain address of the different second blockchain comprises:
sending the message to the blockchain address of the different second blockchain; and
detecting signing of the message by the user.

15. The system of claim 14, wherein the information pertaining to verification includes the message signed by the user and the blockchain address of the different second blockchain, and verifying the blockchain address of the different second blockchain based on the information for the different second blockchain comprises:
decoding the signed message based on the blockchain address of the different second blockchain to determine content of the signed message; and
determining that the content of the signed message matches content of the message and indicates the non-fungible token and a blockchain address of the first blockchain associated with the non-fungible token.

16. The system of claim 9, wherein the at least one processor is further configured to:
grant access to the application in response to verifying the blockchain address for the different second blockchain based on the information for the different second blockchain, wherein the blockchain address of the different second blockchain is used as a login credential for the application.

17. A computer program product for granting access to applications associated with different blockchains, the computer program product comprising one or more computer readable media having instructions stored thereon, the instructions executable by at least one processor to cause the at least one processor to:

receive a non-fungible token of a first blockchain indicated by a user as a login credential for an application associated with a different second blockchain;

verify the non-fungible token is owned by the user;

retrieve information for the different second blockchain from information for different blockchains stored in association with the non-fungible token; and verify a blockchain address of the different second blockchain is associated with the user based on the information for the different second blockchain to grant access to the application based on the non-fungible token of the first blockchain.

18. The computer program product of claim 17, wherein the non-fungible token corresponds to a blockchain domain name.

19. The computer program product of claim 17, wherein verifying the non-fungible token comprises:

sending a message to a blockchain address of the first blockchain associated with the non-fungible token; and detecting signing of the message by the user.

20. The computer program product of claim 17, wherein the instructions executable by the at least one processor further cause the at least one processor to:

verify the blockchain address of the different second blockchain is associated with the user based on the user signing a message; and store information pertaining to verification of the blockchain address of the different second blockchain, wherein the information pertaining to verification is associated with the non-fungible token.

21. The computer program product of claim 20, wherein the information pertaining to verification is stored on the first blockchain.

22. The computer program product of claim 20, wherein verifying the blockchain address of the different second blockchain comprises:

sending the message to the blockchain address of the different second blockchain; and detecting signing of the message by the user.

23. The computer program product of claim 22, wherein the information pertaining to verification includes the message signed by the user and the blockchain address of the different second blockchain, and verifying the blockchain address of the different second blockchain based on the information for the different second blockchain comprises:

decoding the signed message based on the blockchain address of the different second blockchain to determine content of the signed message; and determining that the content of the signed message matches content of the message and indicates the non-fungible token and a blockchain address of the first blockchain associated with the non-fungible token.

24. The computer program product of claim 17, wherein the instructions executable by the at least one processor cause the at least one processor to:

grant access to the application in response to verifying the blockchain address for the different second blockchain based on the information for the different second blockchain, wherein the blockchain address of the different second blockchain is used as a login credential for the application.

\* \* \* \* \*